Fig. 3

Oct. 22, 1946.  W. J. BRETH ET AL  2,409,974
TIRE BUILDING MACHINE
Filed Aug. 6, 1942   12 Sheets—Sheet 4

Fig. 4

INVENTORS
*Walter J. Breth*
*Robert M. Wormald*
BY *Evans + McCoy*
ATTORNEYS

Oct. 22, 1946.  W. J. BRETH ET AL  2,409,974
TIRE BUILDING MACHINE
Filed Aug. 6, 1942   12 Sheets-Sheet 5

INVENTORS
*Walter J. Breth*
*Robert M. Wormald*
BY *Evans + McCoy*
ATTORNEYS

Oct. 22, 1946.  W. J. BRETH ET AL  2,409,974
TIRE BUILDING MACHINE
Filed Aug. 6, 1942    12 Sheets-Sheet 6

INVENTORS
Walter J. Breth
Robert M. Wormald
BY Evans + McCoy
ATTORNEYS

Patented Oct. 22, 1946

2,409,974

UNITED STATES PATENT OFFICE 2,409,974

TIRE BUILDING MACHINE

Walter J. Breth and Robert M. Wormald, Akron, Ohio, assignors to The General Tire and Rubber Company, Akron, Ohio, a corporation of Ohio Application August 6, 1942, Serial No. 453,806

26 Claims. (Cl. 154—10)

This invention relates to a method of and apparatus for building pneumatic tire casings, the present invention being an improvement on the method and apparatus disclosed in the patent to Breth 2,313,035 granted March 9, 1943.

The main objects of the present invention are to provide a method by which the layers of fabric are kept smooth and are uniformly adhered together, and to provide an apparatus for performing the method steps which is of simple and compact construction and which is highly efficient in operation.

A further object of the invention is to provide fabric folding and stitching devices which are so operated as to positively hold the fabric in positions to which it has been folded during the intervals between successive folding and stitching operations.

A further object is to provide folding and stitching devices in which the travel of the stitchers and folders over the fabric is always in the direction to apply tension to the portion of the fabric being folded or stitched, the fabric engaging elements being held out of engagement with the fabric during return movements.

With the above and other objects in view the invention may be said to comprise the method of and apparatus for building tires as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which:

Figs. 15 to 26 show successive positions of the fabric folding and stitching and bead setting devices;

Referring to the accompanying drawings, the tire building machine of the present invention comprises a tire building drum A of conventional construction, which is collapsible to permit removal of a tire after it has been built thereon, and bead applying fabric folding and stitching mechanisms indicated generally by the reference characters B and C and disposed upon opposite sides of the drum. The mechanisms B and C are identical except that one of the mechanisms is mounted upon a carriage which is movable axially of the drum so that the mechanism on the carriage can be moved far enough away from the drum to permit removal of a tire from the drum. Inasmuch as the two mechanisms B and C are identical and their operations are simultaneous, only the mechanism B is illustrated in detail in the accompanying drawings.

The drum A is mounted upon a shaft 1 carried by a supporting frame 2. The drum A is fixed to the shaft and the shaft may be driven to rotate the drum by a motor 3 which drives the shaft 1 at a reduced speed through a small pulley 4, a large pulley 5, a small gear 6, and a large gear 7. The shaft 1 has a reduced end portion 8 which fits in a socket formed in the end of a coaxial shaft 1a which is carried by the frame of the mechanism C. The shaft 1a may be a non-rotatable shaft since it merely serves as a support for the free end of the shaft 1 and to maintain alignment between the mechanisms B and C.

Figure 15:
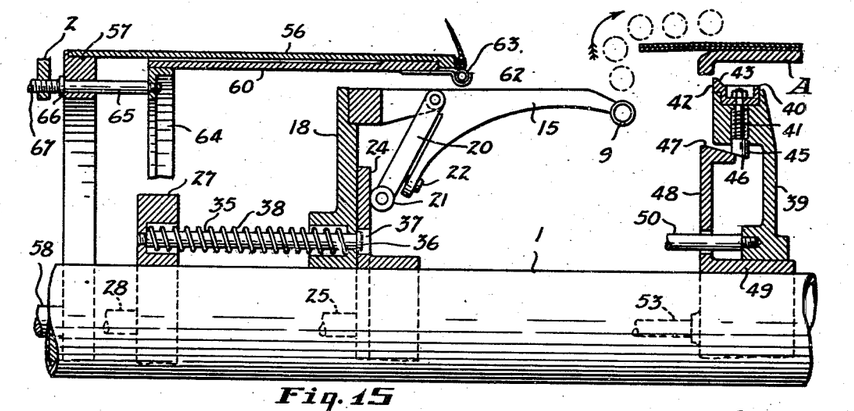
Fig. 15 shows the bead setting and fabric folding and stitching devices in the position which they initially occupy, the dotted circles indicating the initial path of movement of the expansible fabric folding and stitching ring from the position shown in full lines.
Figure 16:
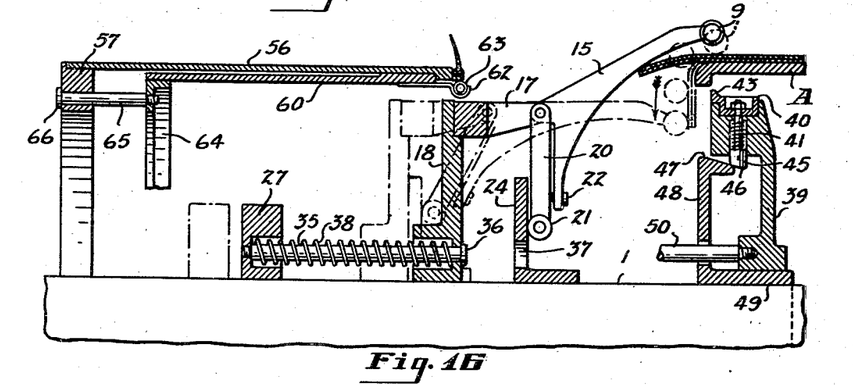
Fig. 16 shows the folding and stitching ring positioned overhanging the edge of the tire building drum outside the fabric band on the drum, the dotted circles showing the path of movement of the ring in folding the fabric inwardly against the drum flange.
Figure 17:
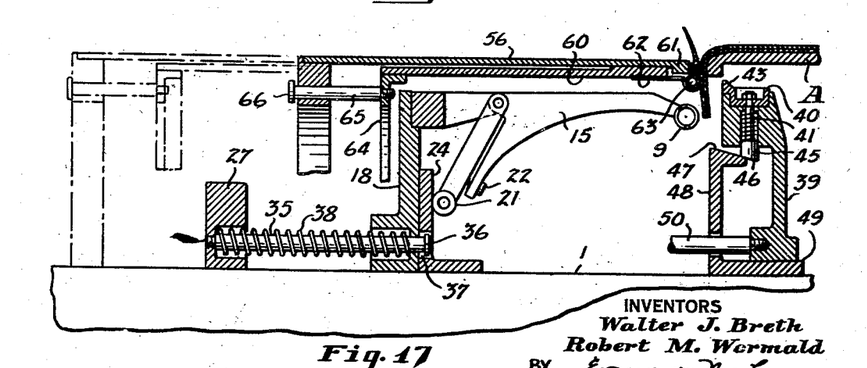
Fig. 17 shows the bead setting device with the bead support adjacent the drum and the presser holding a bead ring against the fabric overlying the drum flange.
Figure 18:
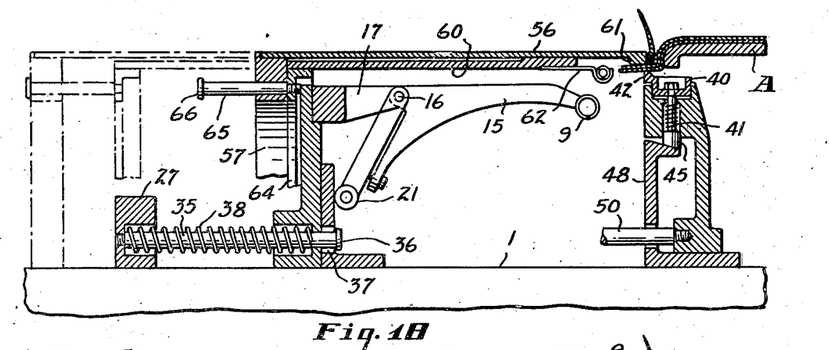
Fig. 18 shows the bead support retracted and the expansible bead engaging member after it has been moved outwardly to a position within the bead ring to fold the fabric across the interior of the bead ring and after it has been expanded to press radially outwardly upon the bead ring.
Figure 19:
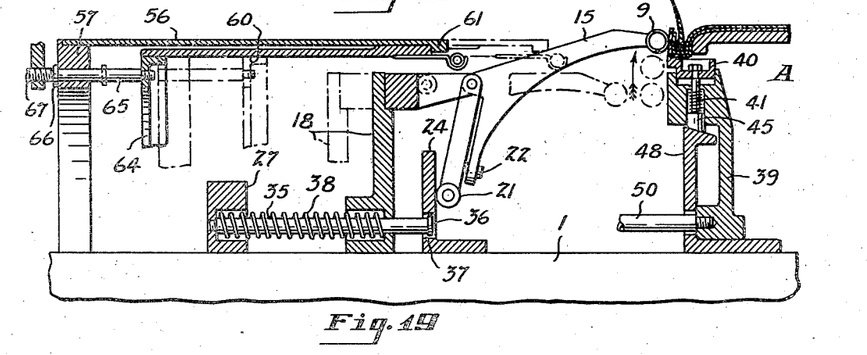
Fig. 19 shows the bead support and presser retracted and the folding and stitching ring pressing the fabric flap against the outside of the bead ring, the dotted lines indicating the movements of the bead support and presser and the folding and stitching rings from the position shown in Fig. 18 to the position shown in full lines.
Figure 20:
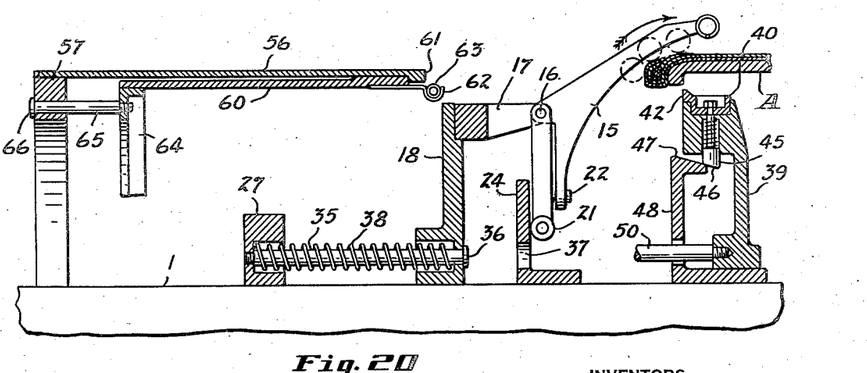
Fig. 20 shows the fabric folding and stitching ring in the position which it occupies after the completion of the folding and stitching movement, the dotted circles indicating the path of movement of the ring during the stitching operation.
Figure 21:
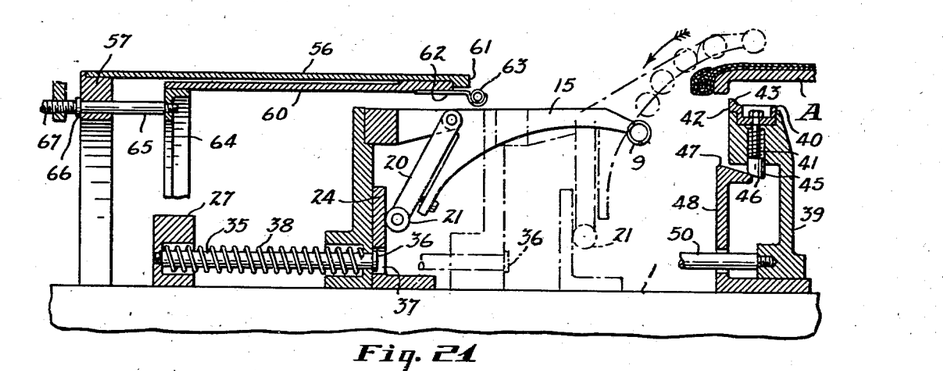
Fig. 21 shows the folding and stitching ring in retracted position, the dotted line indicating the path of movement of the ring from the position shown in Fig. 20.
Figure 22:
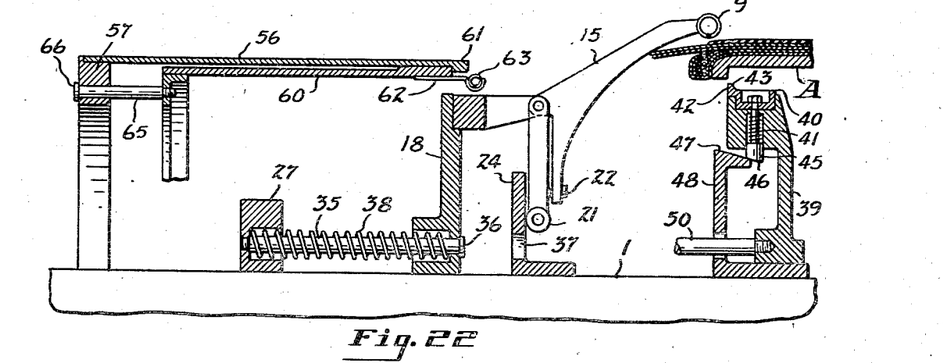
Fig. 22 shows the folding and stitching ring positioned for folding additional layers of fabric over the bead.
Figure 23:
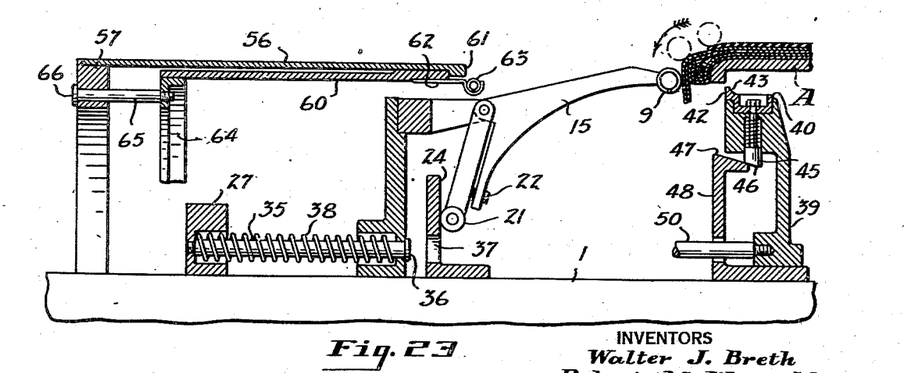
Fig. 23 shows the fabric folding and stitching ring moved down against the side face of the bead.
Figure 24:
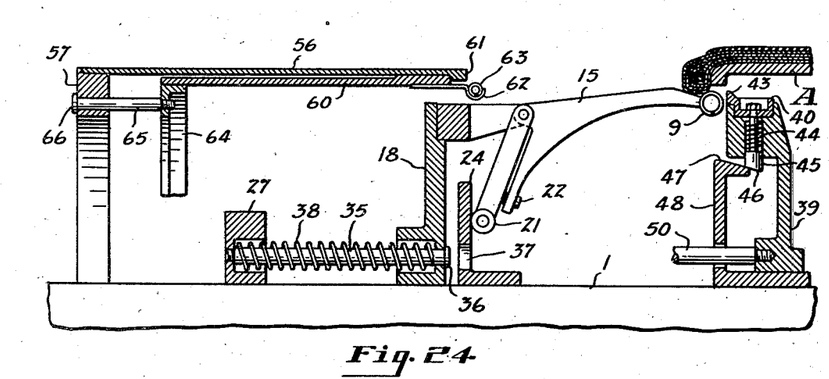
Fig. 24 shows the fabric folding and stitching ring moved inwardly to fold the fabric against the interior of the bead.
Figures 27, 28, 29:
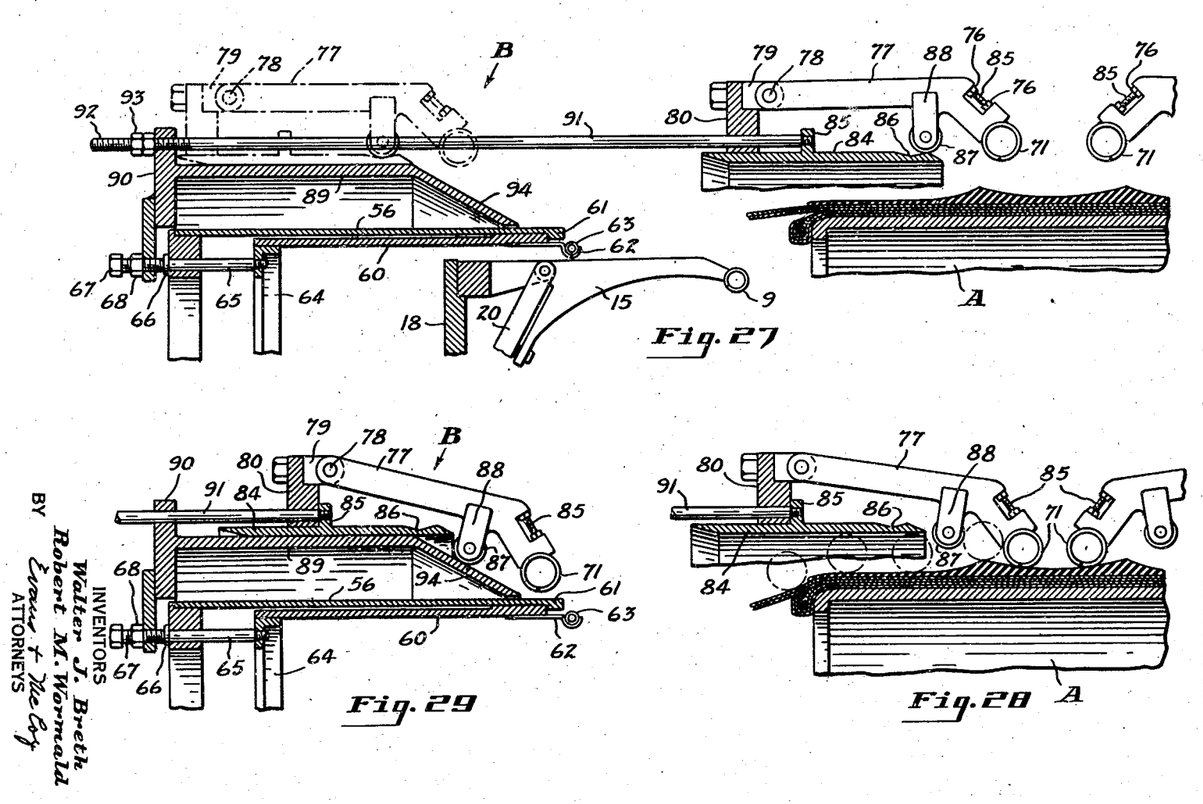
Figs. 27, 28 and 29 show the tread stitching operations, Fig. 27 showing the stitching ring in the position from which it may be contracted into engagement with the central portion of the tread, Fig. 28 showing the ring in tread engaging position, and Fig. 29 showing the tread stitching device near its retracted position.

The sequence of operations performed by the machine of the present invention is shown in Figs. 15 to 29 of the drawings. In building a tire on the drum A, the first operation is to apply a cylindrical band composed of a plurality of layers of rubberized fabric upon the drum A. The fabric employed is of a width greater than the length of the drum so that the edge of the cylindrical band of fabric projects beyond the edge of the drum, as shown in Fig. 15 of the drawings. After the fabric band has been applied to the drum the fabric edges are folded down against the edge flange of the drum, as illustrated in Fig. 16. The folding operation is preferably performed by a stitching annulus which engages the fabric band throughout its circumference and simultaneously folds the band edges throughout the circumference. After the fabric has been folded down against the drum flange, a bead seating ring to which a flipper strip has been applied is pressed against the fabric overlying beyond the flange of the drum, as shown in Fig. 17. The portion of the fabric extending inwardly of the bead ring is then folded outwardly across the bottom of the bead ring, as shown in Fig. 18, and then upwardly against the outer side of the bead ring, as shown in Fig. 19, after which the fabric edges and the flipper strip are stitched down upon the exterior of the fabric band, as shown in Fig. 20. The stitching device is then retracted, as shown in Fig. 21, and additional layers of fabric are built up upon the fabric previously applied to the drum with the edges of the fabric projecting beyond the beads, as shown in Fig. 22. The rubber tread is preferably applied to the fabric carcass and stitched down, as illustrated in Figs. 27, 28 and 29, immediately after the application of the additional fabric layers. The projecting edges of the fabric are then folded down over and under the bead portion of the carcass, as shown in Figs. 23 and 24. The stitching of the tread to the tire carcass is performed as illustrated in Figs. 27, 28 and 29 by moving stitching annuli simultaneously from the center of the tread outwardly over the side edges of the drum. The various fabric folding and stitching operations and the setting of the bead ring are accomplished by mechanisms which are operated at the proper times during the tire building cycle, and these mechanisms will now be described.

*Fabric folding and stitching device*

Figures 8, 9, 10, 11, 12:
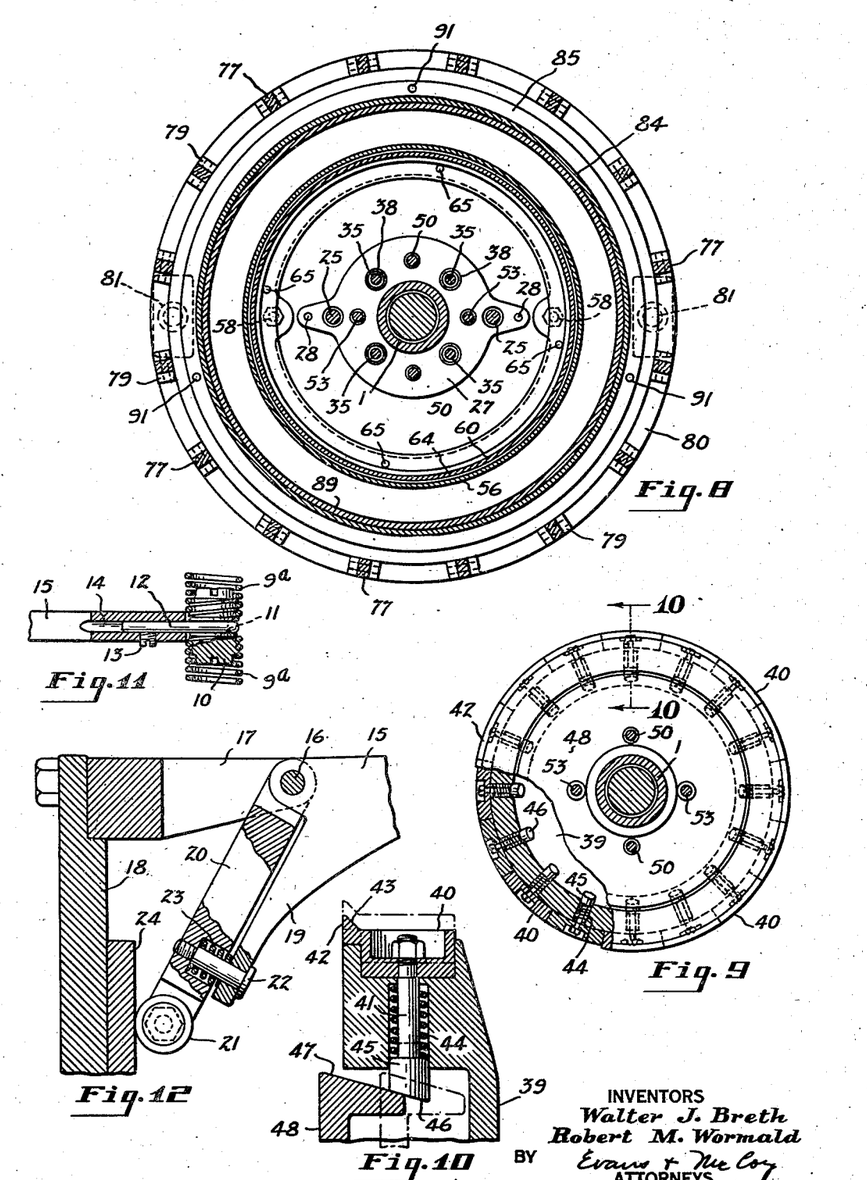
Fig. 8 is a vertical section taken on the line indicated at 8—8 in Fig. 4.
Fig. 9 is a section taken on the line indicated at 9—9 in Fig. 4, looking in the direction indicated by the arrows, a portion of the expansible bead engaging member being broken away and shown in section.
Fig. 10 is a fragmentary section taken on the line indicated at 10—10 in Fig. 9.
Fig. 11 shows a portion of the fabric folding and stitching ring and the attachment of the ring to one of its supporting levers.
Fig. 12 is a sectional view showing on an enlarged scale the inner end portion of one of the levers supporting the fabric folding and stitching ring.
Figure 13:
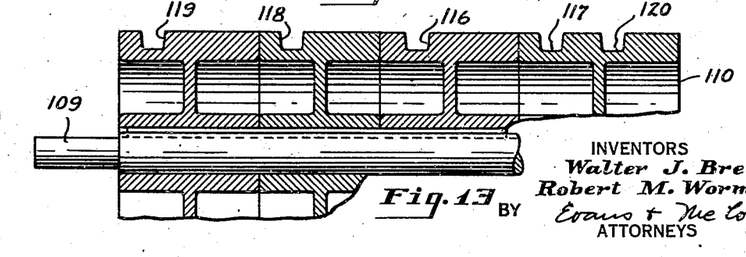
Fig. 13 is an axial section through the cam that controls the stitching and bead setting devices.

The main folding and stitching element is a resilient, contractible annulus 9 composed of a series of coil springs 9a, which are attached at their ends to plugs 10 which have end portions spirally grooved to receive the spring coils, as shown in Fig. 11, and a central groove 11 which receives a hook 12 which has a shank attached by means of a screw 13 in a socket 14 of a radially movable lever 15. The stitching ring is supported by a considerable number of levers 15 which are connected by transverse pivots 16 to spaced projecting arms 17 carried by a supporting disk 18 which is slidable on the shaft 1. The levers 15 are mounted to swing radially with respect to the axis of the drum and are adapted to expand the stitching ring against the action of the springs 9a.

Each of the levers 15 has a depending arm 19 and a buffer link 20 which is pivoted at its outer end to the pivots 16 of the arm and which carries a roller 21 at its inner end. A bolt 22 attached to the link 20 extends through an aperture in the arm 19 and a coil spring 23 surrounding the bolt is interposed between the arm 19 and the link 20, so that actuating thrusts transmitted through the roller 21 are cushioned by the spring 23. The levers 15 are simultaneously swung in an outward direction about their pivots by means of a disk 24 slidably mounted upon the shaft 1 and engageable with the rollers 21. The disk 24 is actuated by means of rods 25 attached to the disk and extending substantially parallel to the shaft 1 to an actuating lever 26.

The stitching and folding ring is not only expansible and contractible but is also movable bodily in an axial direction into and out of operating position. The axial movement of the folding and stitching ring is accomplished by means of an actuating disk 27 which is slidable on the shaft 1 and which may be moved by means of rods 28 attached to the disk 27 and extending parallel with the shaft 1 to an actuating lever 29. The disk 27 has a series of rods 35 attached thereto adjacent its periphery and extending axially from the disk toward the drum A. The rods 35 extend through apertures in the disks 18 and are provided with heads 36 which are engageable with the outer face of the disk 18 to limit the relative axial movements of the disks 18 and 27. The disk 24 is provided with apertures 37 through which the heads 36 of the rods may move so that the disk 24 may be moved independently of the disks 18 and 27.

Coil springs 38 are mounted on the rods 35 and have opposite ends engaging the disks 18 and 27. The springs 38 tend to normally hold the disk 18 against the heads 36 of the rods 35. When the disk 27 is moved axially toward the drum A by means of the rods 28, the springs 38 will cause the disk 18 to move simultaneously with the disk 27 unless such movement of the disk 18 is resisted. Movement of the disk 24 away from the face of the disk 18 moves the outer ends of the levers 15 radially outwardly and expands the stitching ring. The stitching ring may thus be expanded to a diameter greater than that of the drum A and moved axially to overlie the fabric on the periphery of the drum. By moving the disk 24 back toward the disk 18, the springs 9 may be permitted to contract, drawing the stitching ring to a smaller diameter and pressing the ring against the fabric on the drum. When the stitching ring is pressed axially against the side flange of the drum, pressure is exerted through the springs 38, which yield to permit the stitching ring to follow the contour of the side portions of the drum or carcass.

An auxiliary fabric folding device is mounted upon the shaft 1 for movement into and out of a position within the edge portion of the drum. This device comprises an expansible fabric engaging disk 39 which has peripheral, radially movable shoes 40 which are carried by radial plungers 41 slidable in the disk 39. The shoes 40 have fabric engaging flanges 42 provided with tapering faces 43 which provide seats for the bead portion of the carcass during the fabric folding operation. The shoes 40 are normally held in retracted position by springs 44 which surround the plungers 41 and which are interposed between peripheral portions of the disk 39 and enlarged end portions 45 of the plungers 41.

The enlarged portions 45 of the plungers are provided with inclined inner end faces 46 which are arranged for engagement with the conical periphery 47 of a cam disk 48 which is mounted for axial movement toward or away from the disk 39, the disk 48 being provided with a hub 49 upon which the disk 39 is slidable.

Means is provided for moving the disks 39 and 48 relative to one another to expand the shoes 40 into fabric engaging position and to move the disks simultaneously axially along the shaft 1 to fold fabric across the interior of the bead ring. The actuating means comprises axially extending rods 50 attached to the disk 39 and extending through apertures 51 in the disk 48, the outer ends of the rods 50 being connected to an actuating lever 52. A plurality of axially extending actuating rods 53 are attached to the disk 48 and extend to an actuating lever 55. The levers 52 and 55 are operated at the proper times during the folding operation to impart the necessary movements to the shoes and disks.

Bead applying mechanism

A cylinder 56 concentric with the shaft 1 and surrounding the disks 18 and 27 is mounted on the frame 2 for axial movement toward and away from the drum A. A supporting ring 57 is attached to the interior of the cylinder 56 at its outer end and the ring 57 has axially disposed rods 58 attached thereto and extending to an actuating lever 59. An inner cylinder 60 is slidably mounted on the interior of the cylinder 56, the movement of the cylinder 60 being limited by the ring 57 and by an inwardly projecting flange 61 at the inner end of the cylinder 56. The cylinder 60 has circumferentially spaced yieldable resilient arms 62 which project past the interior of the flange 61 and provide spaced supports for a contractible spring ring 63, which provides a support for a previously formed bead ring, as is shown in Figs. 15, 16 and 17.

The cylinder 60 has a ring 64 attached to its interior at its outer end and this ring has a series of axially extending rods 65 attached thereto and projecting through apertures in the ring 57. The rods 65 have heads 66 which engage with the outer face of the ring 57 to limit the inward movement of the cylinder 60 and the heads 66 are engageable with adjustable stops 67 carried by the fixed frame 2. The stops 67 are screw threaded for engagement with suitable threaded openings in the frame and are held in adjusted position by suitable means such as a lock nut 68.

Prior to the application of fabric to the drum A, the bead rings with the flipper strips attached thereto are mounted upon the contractible ring 63, as shown in Fig. 15 of the drawings, and after the fabric has been folded down over the flange of the drum A, the cylinders 56 and 60 are advanced by means of the lever 59 and rods 58 to position the bead ring against the fabric overlying the drum flange, as shown in Fig. 17. The outer cylinder 56 serves as a bead presser to clamp the bead against the fabric on the drum, while the inner cylinder 60 serves as a support for the bead ring up to the time of application of the bead ring to the tire carcass.

Figures 5, 6, 7:
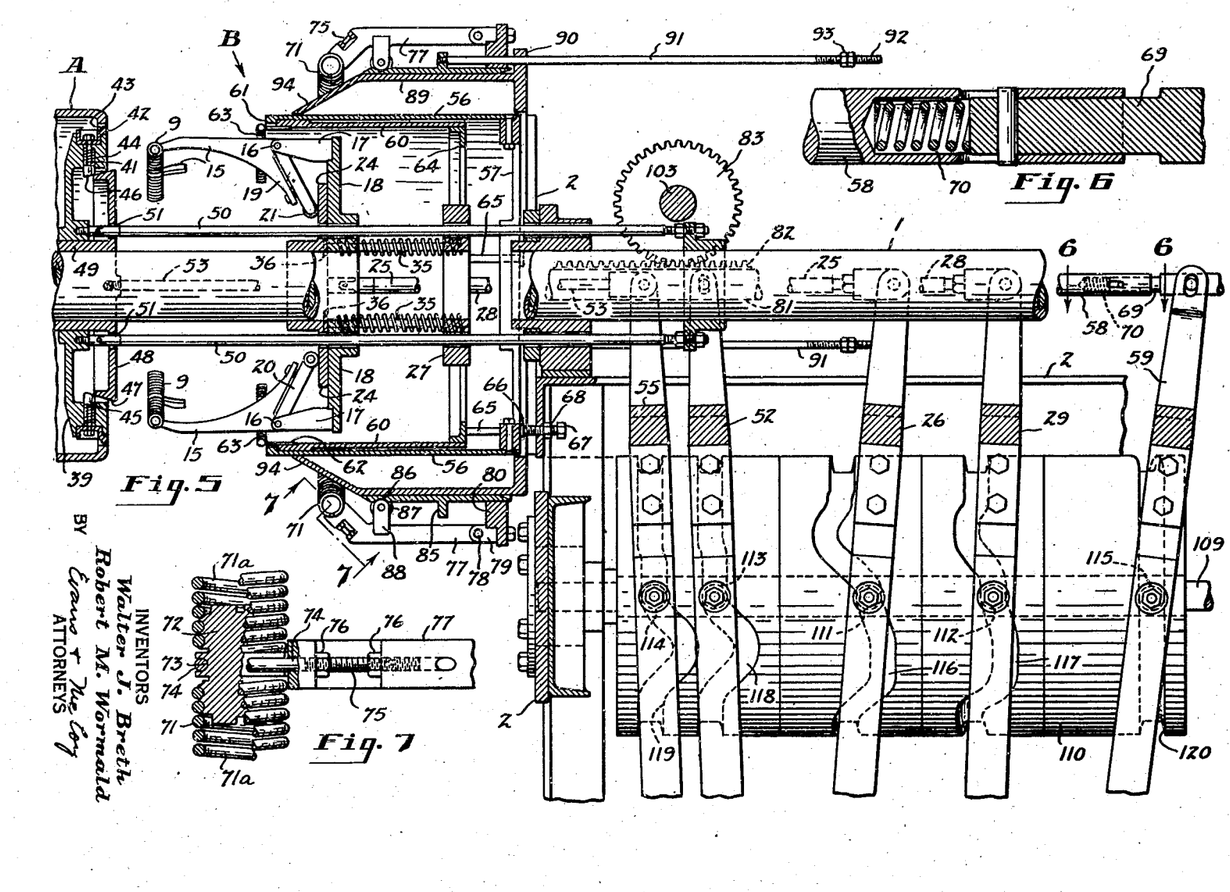
Fig. 5 is a fragmentary vertical section taken on the line indicated at 5—5 in Fig. 3, looking in the direction indicated by the arrows.
Fig. 6 is a sectional detail view taken on the line indicated at 6—6 in Fig. 5.
Fig. 7 is a detail view showing a portion of the tread stitching ring and its attachment to one of its supporting arms.

In order to provide a yielding clamping pressure against the bead ring, the actuating rods 58 preferably have a yielding connection to the actuating lever 59, as best shown in Figs. 5 and 6. This connection comprises a plunger 69 fitting in a socket in the outer end of the rod 58 and a spring 70 interposed between the plunger 69 and the bottom of the socket. The spring 70 is adapted to yield to prevent exertion of excessive pressure against the bead ring.

When the cylinder 56 is moved to retracted position, engagement of the rods 65 with the stops 67 moves the inner cylinder 60 to the position shown in Fig. 15 so that the bead supporting ring 63 is beyond the inner end of the cylinder 56 in position to receive a bead ring. The cylinder 60 moves with the cylinder 56 when the latter is moved axially to bead clamping position, because of the frictional engagement of the coil spring ring 63 with the interior of the bead ring, the outside diameter of the seating ring 63 being normally slightly greater than the internal diameter of the bead ring. When the disk 18 is retracted to move the stitching annulus 9 away from the drum, the inner ends of the pins 65 are engaged by the disk 18 and the cylinder 60 is moved outwardly to position the supporting ring 63 clear of the fabric flap, as shown in Fig. 18.

Tread stock stitching mechanism

The tread stock stitching device includes a resilient annulus 71 composed of a series of coil springs 71a attached at their ends to plugs 72, which are grooved spirally at their ends to receive coil springs 71a and each of which has a central groove 73 to receive a hook 74, which has a threaded end 75 held in adjusted position by lock nuts 76 in the outer end of a supporting arm 77. A large number of regularly spaced supporting arms 77 are employed to support the spring annulus 71 and these arms are mounted for radial swinging movements about transverse pivots 78 connecting the arms 77 to fixed arms 79 attached to a ring 80, which is disposed coaxially with the shaft 1 and which is attached to the inner ends of actuating bars 81 provided with rack teeth 82 which are engaged by actuating pinions 83, by means of which the ring 80 may be moved axially toward or away from the drum A. The ring 80 is slidably mounted upon a cylindrical supporting member 84 and movement of the ring 80 on the member 84 is limited by an external rib 85 formed on the member 84 and intermediate its ends. Adjacent the inner end thereof the supporting member 84 is provided with a circumferential groove 86 which is adapted to receive rollers 87 which are mounted on arms 88 projecting inwardly from the arms 77. The cylindrical supporting member 84 is slidably mounted upon a fixed drum 89 attached to the frame 2, and this drum has a flange 90 at its outer end which limits the outward movement of the member 84 and ring 80. Movement of the supporting member 84 and ring 80 inwardly toward the drum is limited by a series of rods 91 which are attached at their inner ends to the rib 85 of the member 84 and extend through apertures in the ring 80 and flange 90. The outer ends 92 of the rods 91 are threaded and stop nuts 93 are adjustably mounted upon the threaded ends 92.

When the supporting member 84 and ring 80 are moved to a position adjacent the drum, as shown in Fig. 27, by means of the actuating bars 81, the stop nuts 93 are brought into engagement with the flange 90 to limit the movement of the member 84, and since the movement of the ring 80 is limited by the rib 85, the adjustment of the nuts 93 determines the innermost adjustment of the stitching rings 71.

In the retracted position of the tread stitching device, as shown in Fig. 5, the ring 80 is positioned adjacent the outer end of the member 84, and the roller 87 of each of the arms 77 is seated in the groove 86 of the member 84. The spring annulus 71 is thus held in expanded position so that it is free to move over the periphery of the drum, as shown in Fig. 27. Actuation of the bars 81 moves the member 84 and ring 80 simultaneously until the stop nuts 93 of the rods 91 engage the flange 90 of the fixed drum 89, whereupon the axial movement of the member 84 is stopped and continued movement of the ring 80 on the member 84 will cause the rollers 81 to ride out of the groove 86 and over the inner end of the member 84, permitting the spring 71a to contract the annulus 71 into engagement with the tire tread, as shown in Fig. 28 of the drawings. Actuation of the bars 81 in the opposite direction drags the annulus 71 across the periphery of the drum, as illustrated by the dotted circles in Fig. 28, pressing the tread stock against the underlying fabric throughout the periphery of the drum. It will be understood that the two mechanisms on opposite sides of the drum A may bring the stitching devices into engagement with the tread simultaneously and that the movement of the stitching rings from the center to the edge of the drum may be simultaneous. The retracting movement of the ring 80 is continued until the member 84 is again engaged with the drum 89, as shown in Fig. 29, and the rollers 87 of the arm 77 engage the conical cam portion 94 at the inner end of the drum 89, moving the arm 77 radially outward and expanding the annulus 71 as the rollers 87 ride up the conical cam 94. As the rollers 87 approach the outer portion of the cam 94, they engage with the inner end of supporting member 84 and push the member 84 outwardly until its inclined inner edge is aligned with the surface of the cam 94, whereupon the rollers 87 ride over the edge of the supporting member 84 and drop into the retaining groove 86.

Actuating mechanism

A tread stock stitching device and fabric folding and stitching and bead applying devices are preferably actuated independently of the drum A. As herein shown, the tread stitching devices are operated by an electric motor 95 which drives a longitudinal shaft 96 through a sprocket chain 97. The shaft 96 has telescopic driving connection with a coaxial shaft 96a which serves to actuate the corresponding stitching devices of mechanism C. The shaft 96 drives a second longitudinal shaft 98 through a sprocket chain 99 and the shaft 98 drives a crank 100 to which is attached a vertical rack 101 which meshes with a pinion 102 on a shaft 103 which carries the pinions 83, which actuate the bars 81 to shift the tread stitching devices toward or away from the drum A.

The fabric folding, stitching and bead applying devices are actuated by means of an electric motor 104 which drives a transverse shaft 105 through suitable reduction gearing in a housing 106. The shaft 105 carries a worm 107 which meshes with a large worm gear 108, which is fixed to a longitudinal shaft 109 which carries a lever actuating cam 110. The cam 110 serves to operate the levers 26, 29, 52, 55 and 59 in the proper sequence, the levers 26, 29, 52, 55 and 59 being provided with rollers 111, 112, 113, 114 and 115, which engage in circumferential grooves 116, 117, 118, 119 and 120 in the cam 110. The motor 3 for operating the drum A may be manually controlled by suitable start and stop switches (not shown).

Figures 2, 30:
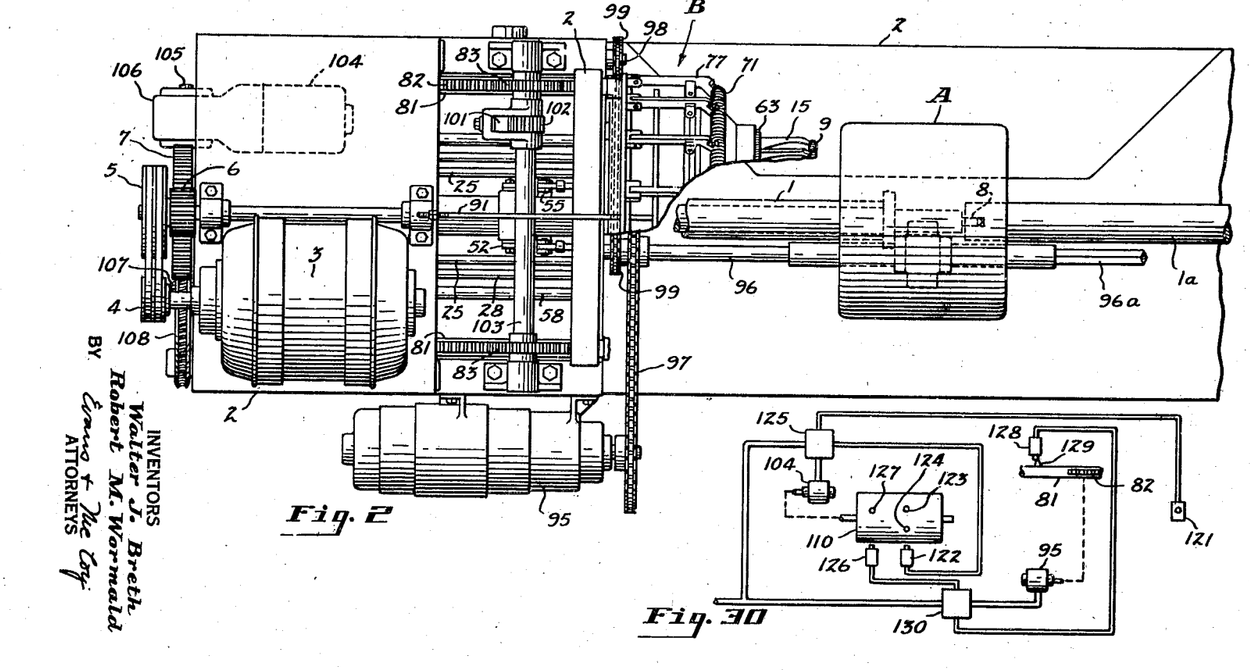
Fig. 2 is a fragmentary top plan view of the portion of the machine shown in Fig. 1.
Fig. 30 is a control diagram showing the manually and automatically operated switches controlling the motors which actuate the folding, bead setting and stitching devices.
Figure 3:
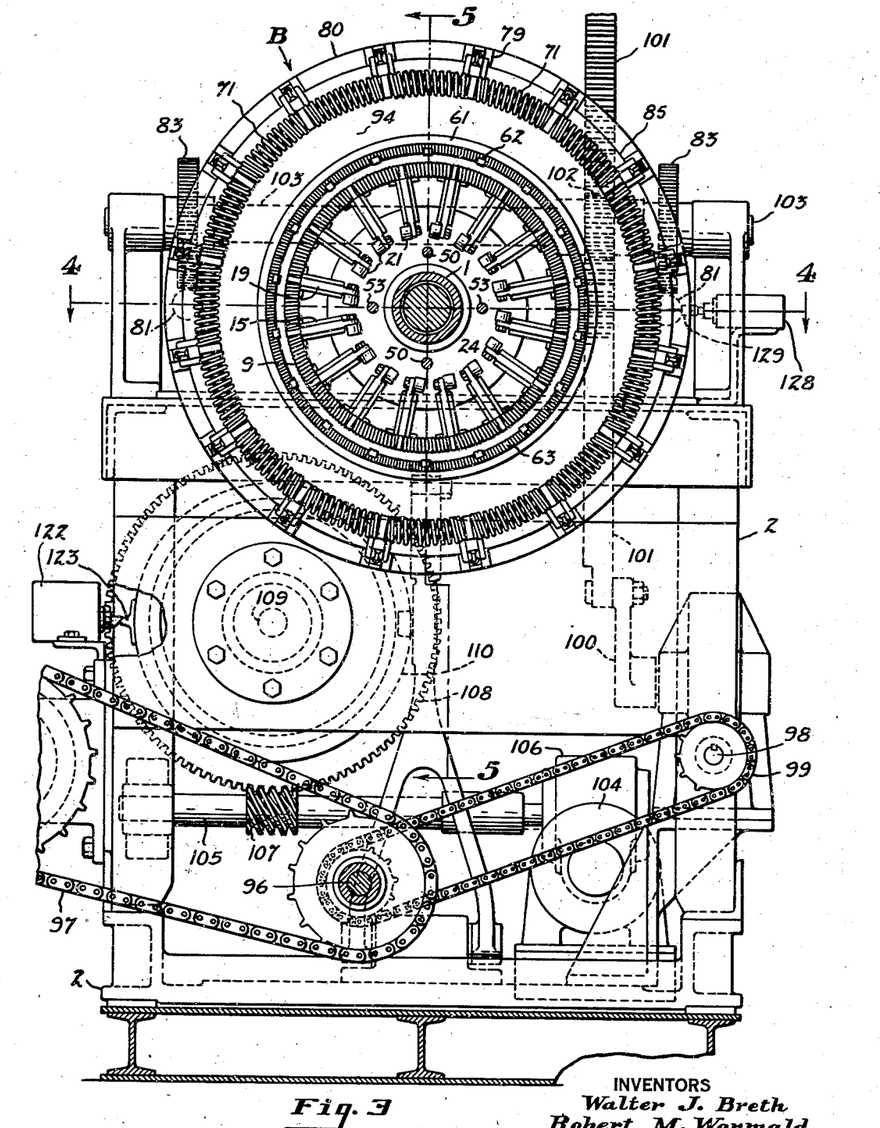
Fig. 3 is a vertical section taken on the line indicated at 3—3 in Fig. 1, looking in the direction indicated by the arrows.
Figure 4:
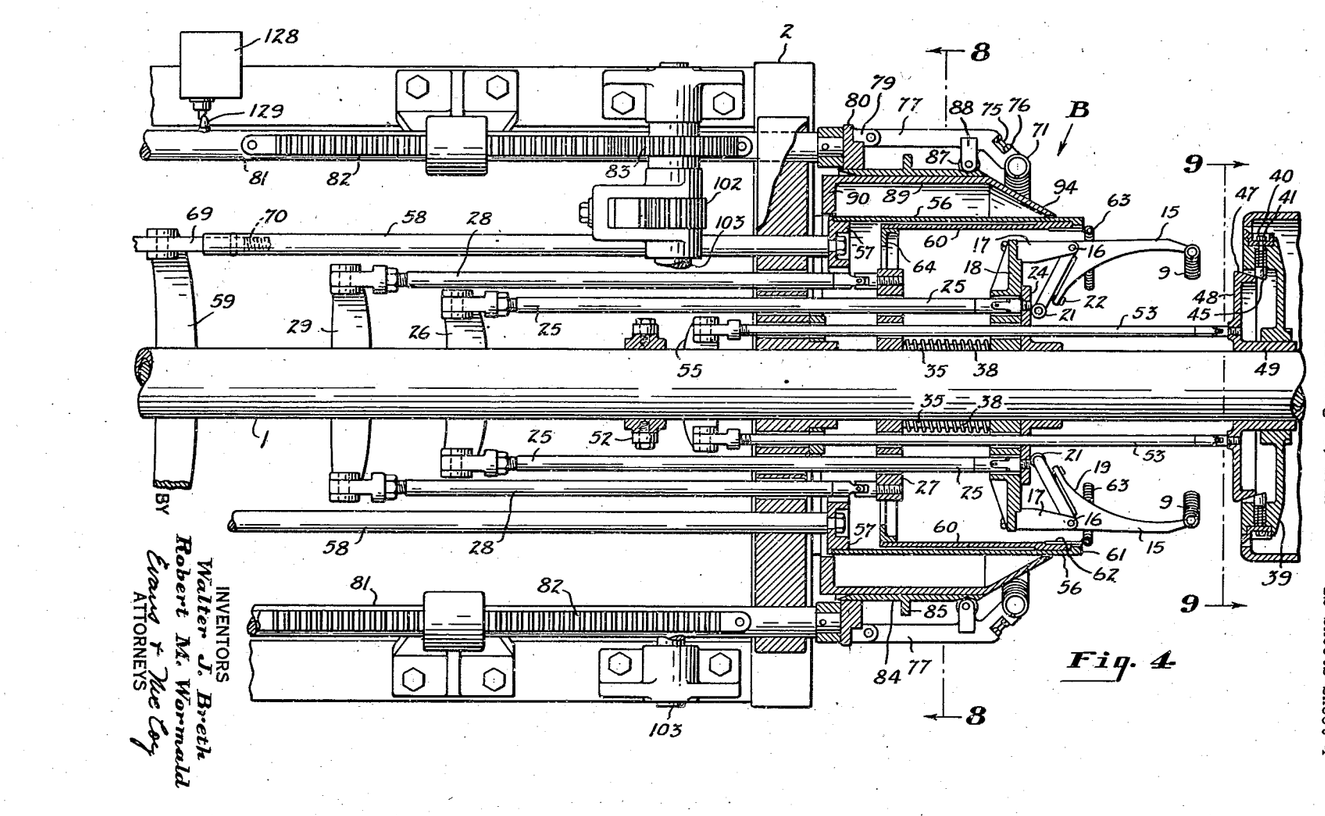
Fig. 4 is a fragmentary horizontal section taken on the line indicated at 4—4 in Fig. 3.

The control for motors 95 and 104 is illustrated diagrammatically in Fig. 30 of the drawings. A push button starting switch 121 is employed to start the motor 104 and the motor 104 is automatically stopped by means of a limit switch 122 which is adapted to be actuated by either of two angularly spaced lugs 123 and 124 on the cam 110. The cam 110 makes one complete revolution during the tire building operation and is stopped during the application of the outer fabric plies and the tread stock. The lug 123 serves to stop the motor 104 after the first fabric folding and stitching operation and the lug 124 serves to stop the motor 104 when the cam has completed its revolution. The start and stop switches 121 and 122 are connected to a controller box 125 provided with the usual auxiliary motor controlling switches.

The motor 95 is controlled by a starter switch 126 adapted to be operated by a lug 127 on the cam 110 and by a limit switch 128 adapted to be operated by a lug 129 on the rod 81, the switches 126 and 128 being connected to a conventional controller box 130. The motor 104 is started by means of the push button switch 121 to start the first fabric folding and stitching operation and is stopped by engagement of the lug 123 with the limit switch 122 after completion of the folding operation. After the outer fabric plies and the tread stock have been applied to the tire carcass, the push button switch 121 is again operated to start the motor 104. Immediately after the second starting of motor 104, the lug 127 on the cam 110 engages the switch 126 to start the motor 95 which operates the tread stitching mechanism. At the completion of the reciprocating stroke of the rods 81, the limit switch 128 is operated by the lug 129 to stop the motor 95. The motor 104 continues to operate and continued rotation of the cam 110 effects the second fabric folding and stitching operation. When the latter stitching operation is completed the cam 110 will have completed its revolution and the motor 104 will be stopped by engagement of the lug 124 with the limit switch 122.

*Operation*

Figure 1:
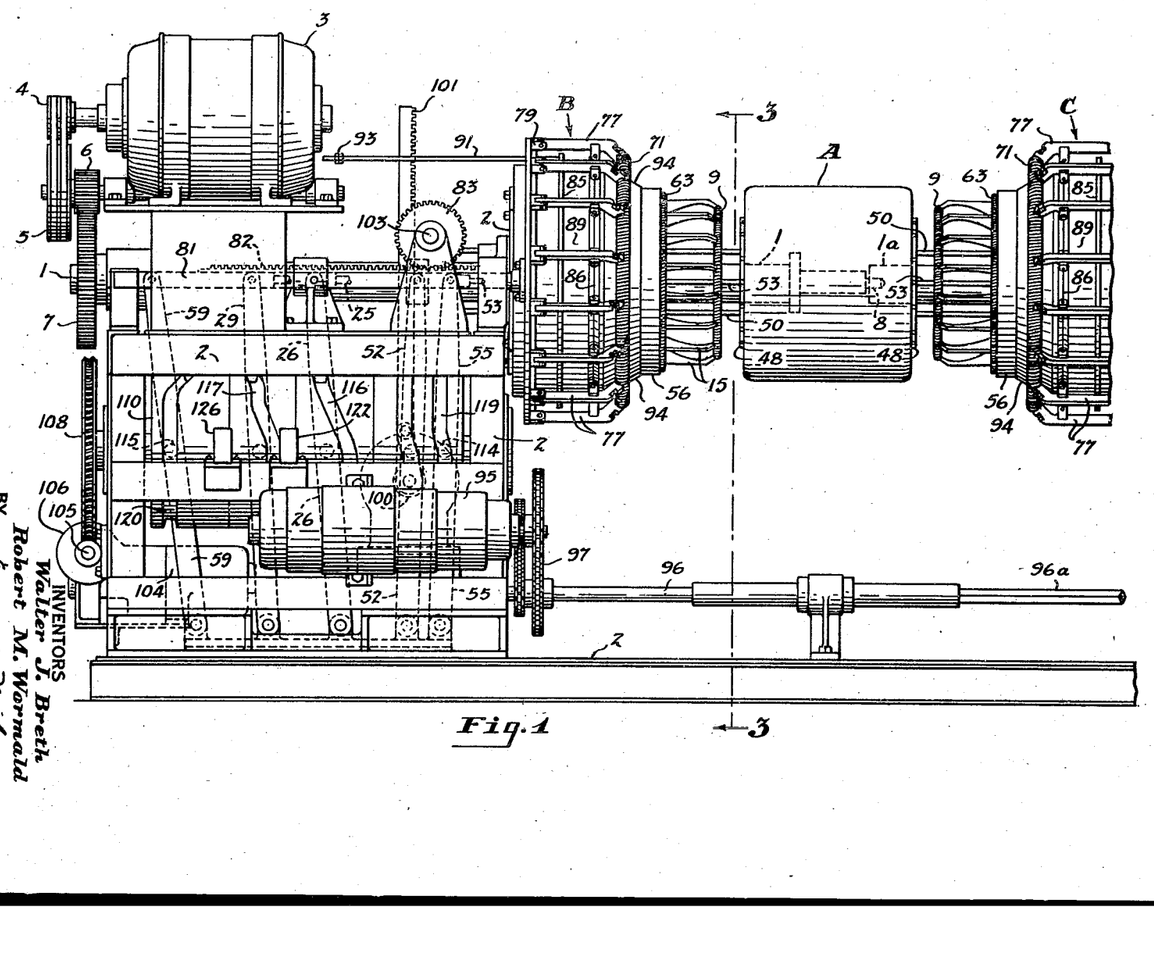
Figure 1 is a fragmentary front elevation of a tire building machine embodying the invention.

The initial step in the tire building operation comprises the application of a plurality of carcass plies of rubberized fabric to the drum A while the mechanisms B and C are inactive and positioned clear of the drum A, as shown in Fig. 1. The tire fabric fed from a suitable source may be applied to the drum A in the usual way while the drum is rotated by the motor 3. The fabric employed is of a width greater than the drum A and is applied in the form of a cylindrical band which projects beyond ends of the drum, as shown in Fig. 15. After the application of the fabric band, the motor 3 is stopped and the motor 104 is started by actuation of its starting switch 121 to turn the cam 110 and operate the fabric folding and stitching and bead applying devices in the proper sequence.

Figure 14:
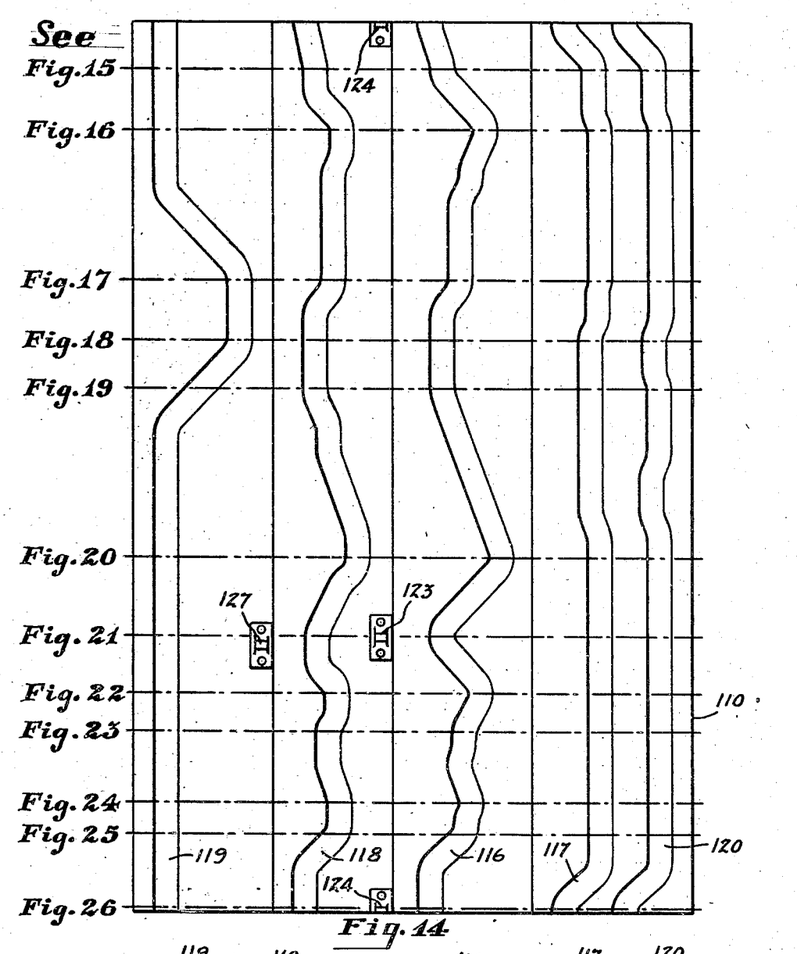
Fig. 14 is a development of the cam in which successive positions of the cam with respect to the actuating rollers which travel in the grooves is indicated by cross lines, which are designated by figure numerals which indicate the figures of the drawings, which show the successive positions of the stitching and bead setting devices.

In Fig. 14 of the drawings the positions of the cam 110 with respect to the rollers carried by the actuating levers for successively moving the parts to the positions shown in Figs. 15 to 26, inclusive, are indicated on the developed cam surface, the position of the rollers in the cam grooves for each of the figures being indicated by the correspondingly designated lines extending transversely across the grooves. To produce the movement of the stitching annulus 9 indicated in Fig. 15, the lever 26 is first actuated to move the disk 24 away from the face of the disk 18 and expand the ring 9, whereupon the lever 29 is swung toward the drum A to advance the ring over the edge of the fabric on the drum, as shown in dotted lines in Fig. 15, to a position surrounding the body of the drum, as shown in Fig. 16. The disk 24 is then retracted and the disk 27 drawn rearwardly to cause the ring 9 to be drawn over the edge of the drum and inwardly over the flange of the drum, as shown in Fig. 16.

It will be understood that the operations performed on opposite ends of the drum are identical and simultaneous so that tension is maintained upon the fabric during the folding operation. The movement of the disks 18, 24 and 27 are so controlled that the ring 9 is held in contact with the inturned flap of the fabric throughout its periphery, as shown in dotted lines in Fig. 16, while the bead carrying devices are moved into drum engaging position, as shown in Fig. 17. This holding of the flap during the movement of the bead applying devices is of importance in that it prevents the fabric from springing out away from the drum flange prior to application of the bead ring. When the bead is firmly clamped against the fabric on the edge of the drum, the fabric is securely held in place by the bead ring and the bead support, so that further holding of the fabric by the ring 9 is unnecessary.

With the parts positioned as shown in Fig. 17, the lever 51 is actuated to shift the disk 39 outwardly and to expand the shoes 40 to approximately the internal diameter of the bead ring, whereupon the disks 39 and 48 are moved outwardly simultaneously by the levers 52 and 55 to draw the flanges 42 of the shoes 40 against the portion of the fabric extending inwardly past the interior of the bead ring, folding the fabric outwardly across the interior of the bead ring, as shown in Fig. 18 of the drawings. After the fabric has been folded across the interior of the bead the disk 24 is again actuated by means of the lever 26 to expand the ring 9, and the disk 18 is moved bodily toward the drum A by means of the lever 29 to press the ring 9 axially toward the drum while the ring 9 moves outwardly across the outer face of the bead ring, folding the edges of the fabric outwardly over the bead ring, as shown in Fig. 19.

As the stitcher ring 9 moves up over the top of the bead ring, as shown in dotted lines in Fig. 20, the pressure of the disk 24 on the rollers 21 is released to permit the springs 9a to contract the ring 9 and exert radial pressure on the edges of the fabric to stitch the same to the underlying carcass plies. When the ring 9 reaches the end of its stitching stroke the disk 24 is shifted inwardly toward the drum to expand the ring 19 to a position clear of the fabric, as shown in full lines in Fig. 20, and the relative position of the disk 24 with respect to the disk 18 is maintained during the initial retractive movement of the disks 18 and 23, so that there is no engagement of the ring 9 with the fabric during the retractive movement, as shown in dotted lines in Fig. 21. This action is important because of the fact that frictional engagement of the ring 9 with the fabric ends while moving in an outward direction would tend to tear the ends away from the fabric to which they are attached, and is apt to impair the attachment between the fabric edges and the underlying layers of fabric.

Figure 25:
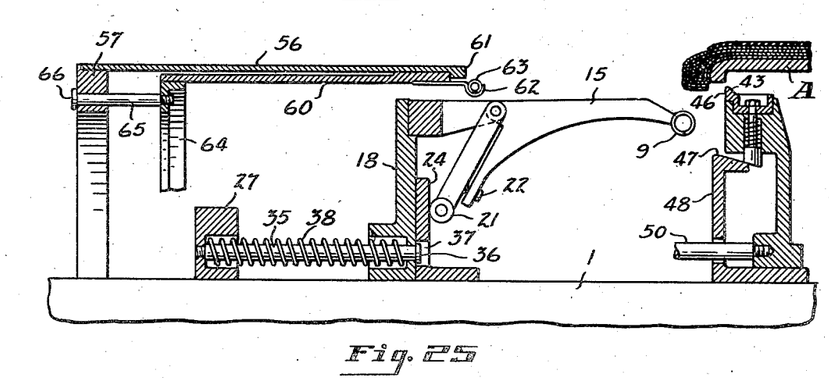
Fig. 25 shows the position to which the fabric folding and stitching ring is moved prior to retraction.
Figure 26:
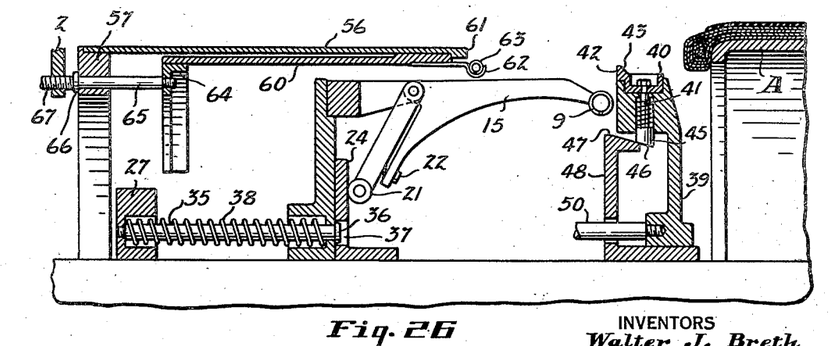
Fig. 26 shows the bead setting and stitching members retracted and the expansible auxiliary folding device moved to a position outside the drum to permit collapse of the drum and removal of a finished tire.

After the bead ring has been applied and the carcass fabric has been folded over the bead and stitched down against the body of the carcass, as shown in Fig. 21, the motor 104 is automatically stopped by engagement of the lug 123 with the limit switch 122, whereupon the operator may again start the motor 3 and apply additional layers of fabric and rubber, as shown in Fig. 22 of the drawings. After the last layers of fabric and rubber have been applied, the motor 104 is again started into operation and further movement of the cam 110 will actuate the starter switch 126 to start the motor 95 to perform the tread stitching operation. During the short interval of time during which the motor 95 is operating the motor 104 is running and the cam 110 is turned through a small angle in which the cam grooves 117, 118, 119 and 120 are substantially parallel and perpendicular to the axis, as shown immediately below the line designated Fig. 21 in Fig. 14. During this period there is a slight expanding movement of the stitching element 9, but this movement is not sufficient to interfere with the tread stitching. After the tread stitching operation the levers 26 and 29 are operated to cause the additional plies of fabric to be folded around and under the previously applied bead, as shown in Figs. 22, 23 and 24 of the drawings. Further movement of the cam causes the ring 9 to be contracted out of engagement with the tire carcass, as shown in Fig. 25, whereupon the stitching ring is retracted and the auxiliary stitching disks 39 and 48 are moved to a position outside the drum A, so that the drum A can be collapsed to permit removal of the tire. Upon completion of this movement of the stitching elements, the cam 110 will have completed its revolution and the motor 104 will have been stopped by engagement of the lug 124 on the cam 119 with the limit switch 122.

It is to be understood that every operation illustrated and described in connection with the mechanism B is performed simultaneously upon the fabric at the opposite end of the drum A by the mechanism C, so that tension of the fabric across the drum face is maintained at all times and uniform pressure is exerted throughout the periphery.

It is to be understood that variations and modifications of the specific device herein shown and described for purposes of illustration may be made without departing from the spirit of the invention.

What we claim is:

1. The method of building a tire on a form having a circular shoulder at the end thereof, which includes in combination the steps of placing ply material on the form with a marginal edge flange portion of the ply material extending radially inward over the shoulder, pressing a bead ring axially against that part of the ply flange overlying the shoulder, and while so pressing the bead ring folding another part of the ply flange against the interior periphery of the bead ring.

2. The method of building a tire on a form having a circular shoulder at the end thereof, which includes in combination the steps of placing ply material on the form with a marginal edge flange portion of the ply material extending radially inward over the shoulder, pressing the inner side of a bead ring against a part of the ply flange overlying the shoulder, folding another part of the ply flange against the interior periphery of the bead ring while so pressing the bead ring, holding said other part of the ply flange against the interior periphery of the bead ring, and while so holding the folded ply flange pressing an outer portion of the ply flange against the outer side of the bead ring to further fold the ply material about the bead ring.

3. The method of building a tire on a form having a circular shoulder at the end thereof, which includes in combination the steps of placing ply material on the form with a marginal edge flange portion of the ply material extending radially inward over the shoulder, pressing the inner side of a bead ring against a part of the ply flange overlying the shoulder, folding another part of the ply flange against the interior periphery of the bead ring, holding the folded part of the ply flange against the interior periphery of the bead ring, and, while so holding the folded ply flange, pressing an outer part of the ply flange against the outer side of the bead ring and against the exterior periphery of the bead ring to enclose the bead ring.

4. In the method of building a tire on a form having a circular shoulder at one end and including the placing of a bead ring against the shoulder and the placing of ply material about the form, the improvement which comprises folding one marginal edge portion of the ply material about the bead ring by a stroking action that occurs simultaneously around substantially the entire circumferential extent of the bead and that progresses inwardly continuously over the outer side face of the bead ring and axially across the interior of the bead ring.

5. In the method of building a tire on a form having a circular shoulder at one end and including the placing of a bead ring against the shoulder and the placing of ply material about the form with one marginal edge portion of the ply material projecting beyond said bead ring, the improvement which comprises the steps of embracing said projecting portion and folding the entire circumferential extent thereof radially inward, first over the exterior periphery of the bead ring, then over the outer side face of the bead ring, and finally over the interior periphery of the bead ring, all by a single and continuous stroking action occurring substantially simultaneously around substantially the entire circumferential extent of the bead ring.

6. In apparatus for building pneumatic tire casings, an annular form having an opening in the end thereof and a circular shoulder surrounding said opening, a substantially annular folder and means for supporting and actuating the folder to move over the form, while embracing the latter, in an axial direction toward said end and then over the shoulder to fold the marginal edge portion of ply material on the form radially inward and provide a ply flange extending radially across said opening, and means for placing a circular bead against that portion of the ply flange overlying the shoulder, said first named means being arranged to support the folder in position to engage the ply flange radially inward of the shoulder during placing of the bead to restrain outward turning of the ply flange.

7. Tire building apparatus comprising a form having a circular shoulder at one end, an expansible and contractible folding annulus, means for supporting and actuating the annulus to carry the latter to an embracing position around the form and to then move the annulus axially over the form to said end and contractingly over the shoulder to fold ply material inwardly over the shoulder, and means for placing a bead against the infolded ply material, said first named means being coordinated with the last named means to support the annulus against the infolded ply material during the placing of the bead to restrain reverse movement of the ply material.

8. In apparatus for building tires, a device for supporting and placing annular beads comprising a substantially annular, resilient, expansible and contractible member for engaging the inside of a bead received thereon around substantially the entire circumference of the bead, said member in unstressed condition being slightly larger than when disposed within a bead whereby to resiliently and frictionally hold a received bead, a circular support, finger elements mounted on the support and having connection with the resilient member to support the latter, and means disposed radially outward of the finger elements for moving axially relative to the resilient member against a supported bead for releasing such bead from the resilient member.

9. In apparatus for building tires, a device for supporting and placing annular beads comprising a substantially annular helical coil of resilient spring material, said coil being receivable within a bead to support the latter and in unstressed condition being of slightly larger circumference than when so received whereby to resiliently and frictionally hold a bead, a circular support, finger elements mounted on the support and having connection with the coil to support the latter, means disposed radially outward of the finger elements and engageable with the outer side of a bead carried by the coil, and means for withdrawing the coil axially from within a bead.

10. Tire building apparatus comprising a circular form having a circular shoulder at one end, folding means operative over said end of the form to engage ply material carried by the form, including a contractible annulus engageable with the ply material, substantially simultaneously around substantially the entire circumferential extent of the form, and means for moving the annulus over the form to said end and radially inward over the shoulder to fold the ply material against the latter and for supporting the annulus against the folded ply material to resist unfolding thereof, and means for placing a bead ring against the ply material overlying said shoulder while unfolding of the latter is prevented by the annulus.

11. In apparatus for building pneumatic tire casings, an annular form having an end shoulder, a resiliently contractible annulus at one end of said form which is normally of a diameter less than that of the form, means for expanding said annulus to a diameter greater than the form and for releasing the same to permit it to contract, means for moving said annulus axially in either direction whereby it may be moved when expanded over the end of the form, contracted into engagement with the drum periphery and drawn axially over the end of the drum and contracted radially over said shoulder, and means for yieldably pressing said annulus axially against said shoulder during inward movement of the annulus over said shoulder.

12. In apparatus for building pneumatic tire casings, an annular form having an end shoulder, a resiliently contractible annulus at one end of said form which is normally of a diameter less than that of the form, means for expanding said annulus to a diameter greater than the form, comprising a series of levers interiorly engaging said annulus and movable radially to expand said annulus, a movable lever actuating member, yielding means interposed between said actuating member and said levers, and means for moving said annulus axially and for yieldably pressing the same against said shoulder.

13. Tire building apparatus comprising an annular form, a supporting member mounted laterally of the form for movement axially with respect to the form, a series of levers extending axially toward said form and pivoted to said supporting member to swing radially with respect to the axis of the form, an expansible and contractible fabric stitching and folding annulus carried by said levers, an axially movable member engaging said levers for simultaneously actuating said levers to expand said annulus, means for shifting said supporting member including a second axially movable actuating member, a spring interposed between said actuating member and said supporting member, and means for operating said axially movable members to expand or contract said annulus to a diameter greater than the form and to shift the annulus axially.

14. Tire building apparatus comprising an annular form, a supporting member coaxial with the form and movable toward or away from an end of said form, a series of levers pivoted to said supporting member at points equally spaced from the axis and extending toward said form, each of said levers having an arm projecting inwardly toward the axis, an expansible and contractible annulus carried by said levers, an axially movable member engaging said arms, means for moving said supporting member toward and away from the form, and means for moving said arm engaging member away from and toward said supporting member to expand and contract said annulus.

15. In a tire building apparatus a fabric stitching and folding annulus comprising an endless series of coil springs, joined end to end by plugs having end portions fitting within the ends of adjacent springs.

16. In a tire building apparatus a fabric stitching and folding annulus comprising an endless series of coil springs, joined end to end by plugs having end portions fitting within the ends of adjacent springs, said plugs having helical grooves to receive end coils of said springs and a central groove to receive a supporting member.

17. Tire building apparatus comprising an annular form, fabric folding and bead applying members mounted for axial movement toward and away from an end of said form, an axially movable tread stitching device, means including a motor for actuating said fabric folding and bead applying devices, means including a motor for operating said tread stitching device, and means controlled by said first mentioned motor for starting and stopping the last mentioned motor.

18. The method of building a tire on a drum having an end shoulder which comprises placing a tubular band of ply material upon the drum with an edge portion thereof projecting past said shoulder, folding said edge portion inwardly to provide a circumferentially continuous inwardly projecting flange of ply material overlying said shoulder, applying a bead ring to and holding the same against said flange, folding a part of the flange outwardly against the interior of the bead ring while the ring is so held, holding the folded part of the flange against the interior of the bead ring substantially throughout the circumference thereof, applying a radial outward pressure to the outer part of the ply flange substantially throughout the circumference thereof to fold the same against the outer face of the bead ring while so holding the ply material against the interior of the bead ring.

19. The method of building a tire on a drum having an end shoulder which comprises placing a tubular band of ply material upon the drum with an edge portion thereof projecting past said shoulder, folding said edge portion inwardly to provide a circumferentially continuous inwardly projecting flange of ply material overlying said shoulder, applying a bead ring to said flange, and engaging said ply flange inwardly of the bead ring and applying pressure thereto in an axial outward direction substantially throughout the circumference thereof to fold the same outwardly within the bead ring, applying radial outward pressure to the ply material within the bead ring substantially throughout the circumference thereof to hold the same against the bead ring, and applying radial outward pressure to portions of the ply flange projecting past the bead ring to fold the same outwardly against the outer face of the bead ring.

20. Tire building apparatus comprising a drum adapted to receive a fabric band and having a bead seating end shoulder, means for folding an edge of a fabric band on the drum inwardly over said shoulder, means including an axially movable bead ring supporting member for applying a bead ring to the fabric overlying the shoulder and for holding the bead ring against the fabric, means operable while the bead ring is held against the fabric for folding the fabric outwardly across the interior of the bead ring, means for pressing the outwardly folded fabric radially outwardly against the interior of the ring and for maintaining said outward pressure substantially throughout the circumference of the ring, and means operable while pressure is so applied to the fabric for folding the edge of the fabric band outwardly against the outer face of the bead ring.

21. Tire building apparatus comprising a drum adapted to receive a fabric band and having a bead seating end shoulder, means for folding an edge of a fabric band on the drum inwardly over said shoulder, means for applying a bead ring to the fabric overlying the shoulder, means for folding the fabric outwardly across the interior of the bead ring, an expansible annulus adapted to be positioned within bead ring, means for expanding said annulus to press the fabric against the interior of the bead ring, a second expansible annulus adapted to be positioned within the projecting edge of the fabric band, and means for expanding said second annulus to fold the fabric against the outer face of said bead ring.

22. In apparatus for building pneumatic tire casings, an annular form having an end shoulder, an expansible and contractible annulus concentric with the drum and mounted adjacent thereto for movements radially inwardly and outwardly across said shoulder, means for moving said annulus axially to position the same around or within edge portions of ply material projecting beyond said shoulder, means for expanding or contracting said annulus to fold the ply material, and means for yieldably pressing said annulus axially against material overlying said shoulder during radial movements of the annulus across said shoulder.

23. In a tire building machine, a tire building drum having a bead positioning shoulder, a bead supporting annulus coaxial with the drum mounted for movement toward and away from said shoulder, fabric folding means comprising a spring ring that is normally of smaller diameter than said bead supporting annulus, means for supporting the spring ring coaxially with said bead supporting annulus, means for expanding said ring to a diameter greater than the drum, for moving the expanded ring axially to position the same for engagement with a fabric band on the drum and for releasing said ring to permit it to contract into engagement with the fabric and fold the same inwardly over the drum shoulder, and means for moving said bead supporting annulus over the contracted ring to apply the bead ring to the fabric overlying the drum shoulder.

24. In a tire building machine, a tire building drum having a bead seating shoulder, a drum supporting shaft, a member slidably mounted on said shaft beyond an end of said drum, an expansible spring ring normally of less diameter than said drum carried by said member, means including a second member slidable upon said shaft for expanding said ring, and means for moving said slidable members, one relatively with respect to the other to expand and release said ring and for moving said members simultaneously to shift the ring toward or away from the drum.

25. Tire building apparatus comprising an annular tire building form having an end shoulder defining an end opening, coaxial bead ring supporting and pressing members movable axially of the form for applying a bead to fabric overhanging said shoulder, a fabric folding member mounted for axial movement from a position within the drum into engagement with the fabric adjacent the shoulder substantially throughout its circumference, means for actuating said supporting and pressing members to apply the bead ring and for withdrawing said supporting member from the bead ring while the bead ring is held against said shoulder by the pressing member, and means for moving said fabric folding member outwardly to fold the fabric radially outwardly against the interior of the bead ring while the bead ring is held by the pressing member.

26. Tire building apparatus comprising an annular tire building form having an end shoulder defining an end opening, a shaft extending through the opening into the interior of the form, a fabric folding member mounted for axial movement on the shaft inwardly and outwardly through said opening, said member having a peripheral portion for engaging the fabric adjacent said shoulder, an annular bead presser mounted on said shaft for movement toward and away from said shoulder, a bead ring support telescopically mounted within the presser, means for moving said support and presser toward said shoulder to apply a bead ring to fabric on the form and overhanging the shoulder, and means for moving the bead ring support outwardly from within the bead ring while the bead ring is pressed against the shoulder by said presser, and for moving said fabric folding member outwardly to fold the fabric radially outwardly against the interior of the bead ring while said bead ring is held by said presser.

WALTER J. BRETH.
ROBERT M. WORMALD.